US007636112B2

(12) United States Patent
Hsu et al.

(10) Patent No.: US 7,636,112 B2
(45) Date of Patent: Dec. 22, 2009

(54) IMAGE PROCESSING APPARATUS AND METHOD

(75) Inventors: Chih-Long Hsu, Tao Yuan Shien (TW); Sheng-Hung Cheng, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 365 days.

(21) Appl. No.: 11/822,224

(22) Filed: Jul. 3, 2007

(65) Prior Publication Data

US 2008/0094491 A1    Apr. 24, 2008

(30) Foreign Application Priority Data

Oct. 18, 2006    (TW) .............................. 95138329 A

(51) Int. Cl.
*H04N 5/217*    (2006.01)

(52) U.S. Cl. .................. 348/241; 348/273; 348/280; 382/162; 382/275

(58) Field of Classification Search ................... None
See application file for complete search history.

(56) References Cited

U.S. PATENT DOCUMENTS

| | | | | | |
|---|---|---|---|---|---|
| 5,003,618 | A | * | 3/1991 | Meno | 382/261 |
| 5,461,655 | A | * | 10/1995 | Vuylsteke et al. | 378/62 |
| 6,069,716 | A | * | 5/2000 | Yamamoto | 358/518 |
| 6,512,854 | B1 | * | 1/2003 | Mucci et al. | 382/275 |
| 6,667,815 | B1 | * | 12/2003 | Nagao | 358/1.9 |
| 6,721,448 | B2 | * | 4/2004 | Rao et al. | 382/164 |
| 2002/0009216 | A1 | * | 1/2002 | Ogino | 382/131 |
| 2002/0034337 | A1 | * | 3/2002 | Shekter | 382/275 |
| 2002/0094114 | A1 | * | 7/2002 | Ogino | 382/128 |
| 2003/0002747 | A1 | * | 1/2003 | Zaklika et al. | 382/260 |
| 2003/0095716 | A1 | * | 5/2003 | Gindele et al. | 382/260 |
| 2003/0156301 | A1 | * | 8/2003 | Kempf et al. | 358/486 |
| 2005/0220360 | A1 | * | 10/2005 | Zaklika et al. | 382/275 |
| 2006/0173628 | A1 | * | 8/2006 | Sampas et al. | 702/19 |
| 2007/0014435 | A1 | * | 1/2007 | Mirowski et al. | 382/109 |
| 2007/0223839 | A1 | * | 9/2007 | Kisilev et al. | 382/286 |
| 2007/0296871 | A1 | * | 12/2007 | Yoo et al. | 348/701 |

FOREIGN PATENT DOCUMENTS

EP        280412 A2 *    8/1988

* cited by examiner

*Primary Examiner*—Nhan T Tran
*Assistant Examiner*—Angel L Garces-Rivera
(74) *Attorney, Agent, or Firm*—Stites & Harbison PLLC; Juan Carlos A. Marquez, Esq.

(57) ABSTRACT

The invention discloses an image processing apparatus and method. The method of the invention first splits the image into a green color plane, a red color plane and a blue color plane. Afterward, each one of the green color plane, the red color plane and the blue color plane is sequentially masked by a working window, such that each of the pixels on the one color plane is sequentially located at the center of the working window and referred to as a central pixel. Then, the pixels other than the central pixel in the working window are classified into edge pixels and non-edge pixels. Finally, a filtered central pixel is calculated according to a formula, and the central pixel is replaced with the filtered central pixel, whereby the noises of the image remained in the CFA domain are suppressed.

8 Claims, 5 Drawing Sheets

IMAGE PROCESSING APPARATUS AND METHOD

BACKGROUND OF THE INVENTION

1. Field of the Invention

The present invention is related to an image processing apparatus and method and, more particularly, to an image processing apparatus and method for noise suppression.

2. Description of the Prior Art

In a digital imaging system such as digital camera or digital video camera, raw images of an object/scene captured from a sensing or capture device are often subject to various types of "noise" (elements not present in the object or environment which may nonetheless appear in the image). The presence of noise in an image is perhaps caused by the characteristics of the imaging system, such as the sensor, or processing steps subsequent to the initial image capture, which may add noise while trying to achieve a different purpose. The properties and characteristics that would identify a pixel or a region of pixels as "noisy" and the properties that would identify a pixel or a region of pixels as an edge or a fine detail of the image are difficult to distinguish. Thus, the noise inhibiting methods of the prior arts often remove the edge or detail pixels or region of pixels of the image, and therefore a blurring effect occurs within that region of the image, and lowers the quality of the image. In addition, in color images, the blurring effect leads to a bleeding of one color across the edge to another pixel(s).

In the prior art, when the object/scene is imaged by a sensing or imaging device, such as a digital camera, the resultant image in captured into a CFA (Color Filter Array) bearing a particular color channel pattern. One oft-used pattern for capturing images is known as the Bayer pattern, which has color channels as follows,

GRGRGRG...

BGBGBGB...

GRGRGRG...

Thus, in a Bayer pattern CFA, each pixel location has an intensity value associated only with one of the three color planes (Green, Red and Blue) which combine to make a full color. The process of estimating the two missing color components for each pixel location is known in the art as color interpolation. The interpolation of color often precedes the removal of noise in color mages due to the fact that most traditional noise reduction or removal techniques are designed to operate upon images with full color pixel information. The process of color interpolation itself will introduce noises, such that the original captured image noise may be blended with other noises and may perhaps lose the distinction of being noises and gain the distinction of being an image feature.

Traditionally, performing noise removal on the full color pixels attained by the color interpolation process increases the memory and processing needs of the noise removal process by three times (since each pixel has thrice the resolution), and thus it is difficult and expensive to improve the noise removal in hardware. Other noise removal techniques attempt to reduce this burden by performing color space conversion after color interpolation into, for instance, the YUV space, where only the Y (chrominance) component is considered for noise removal, so as to reduce the burden of hardware. However, this too may propagate additional noise beyond that propagated by color interpolation and cannot be easily implemented in hardware as well.

Thus, there is a need for a noise reduction framework that will not only distinguish edge pixels from non-edge pixels, but also one that can work directly in the CFA image domain prior to any color interpolation, so as to increase the processing efficiency, and lower the hardware cost.

SUMMARY OF THE INVENTION

Accordingly, a scope of the invention is to provide an image processing apparatus and method. Particularly, the image processing apparatus and method of the invention can increase the efficiency of noise suppression and further reduce the hardware cost.

According to a preferred embodiment, the image processing method of the invention is used for the purpose of reducing noises of a captured or recorded image in a color filter array (CFA) domain. Furthermore, the method includes the following steps:

First of all, split the image into a green color plane, a red color plane and a blue color plane.

Sequentially masks each of the green color plane, the red color plane and the blue color plane with a working window such that each of the pixels of said one color plane is sequentially located at the center of the working window and referred to as a central pixel (Cc).

Furthermore, classify the pixels other than the central pixel in the working window into N edge pixels ($C_{edge,i}$) and M non-edge pixels ($C_{non,j}$), N and M both are integers larger than 1, i is an integer index ranging from 1 to N, and j is an integer index ranging from 1 to M.

Finally, calculate a filtered central pixel ($C_{fc}$) according to the following formula, and replaces the central pixel ($C_c$) with the filtered central pixel ($C_{fc}$):

$$C_{fc} = \frac{C_c + \sum_{i=1}^{N} C_{edge,i} \cdot WEI2(|C_c - C_{edge,i}|) + \sum_{j=1}^{M} C_{non,j} \cdot WEI1(|C_c - C_{non,j}|)}{1 + \sum_{i=1}^{N} WEI2(|C_c - C_{edge,i}|) + \sum_{j=1}^{M} WEI1(|C_c - C_{non,j}|)}$$

wherein WEI1 is a first distribution function, and WEI2 is a second distribution function.

Accordingly, the noises of the captured or recorded image remained in the CFA domain can be suppressed.

According to another preferred embodiment, the image processing apparatus of the invention is also used for reducing noises of a captured or recorded image in a CFA domain. The image processing apparatus includes a storage unit and an image processing unit.

The storage unit is used for separately receiving a green color plane, a red color plane and a blue color plane of the image.

The image processing unit is coupled to the storage unit, for sequentially masking a working window on each of the green color plane, the red color plane and the blue color plane, such that each of the pixels of said one color plane is sequentially located at the center of the working window and referred to be as a central pixel ($C_c$).

The image processing unit also classifies the pixels other than the central pixel in the working window into N edge pixels ($C_{edge,i}$) and M non-edge pixels ($C_{non,j}$), N and M both are integers larger than 1, i is an integer index ranging from 1 to N, and j is an integer index ranging from 1 to M.

Furthermore, the image processing unit calculates a filtered central pixel ($C_{fc}$) according to the following formula, and replaces the central pixel ($C_c$) by the filtered central pixel ($C_{fc}$):

$$C_{fc} = \frac{C_c + \sum_{i=1}^{N} C_{edge,i} \cdot WEI2(|C_c - C_{edge,i}|) + \sum_{j=1}^{M} C_{non,j} \cdot WEI1(|C_c - C_{non,j}|)}{1 + \sum_{i=1}^{N} WEI2(|C_c - C_{edge,i}|) + \sum_{j=1}^{M} WEI1(|C_c - C_{non,j}|)}$$

wherein WEI1 is a first distribution function, and WEI2 is a second distribution function.

Accordingly, the noises of the captured or recorded image remained in the CFA domain can be suppressed by the image processing apparatus of the invention.

BRIEF DESCRIPTION OF THE APPENDED DRAWINGS

DETAILED DESCRIPTION OF THE INVENTION

The present invention provides an image processing apparatus and method for effectively suppressing noise of image. The preferred embodiments are disclosed as below.

Figure 1:
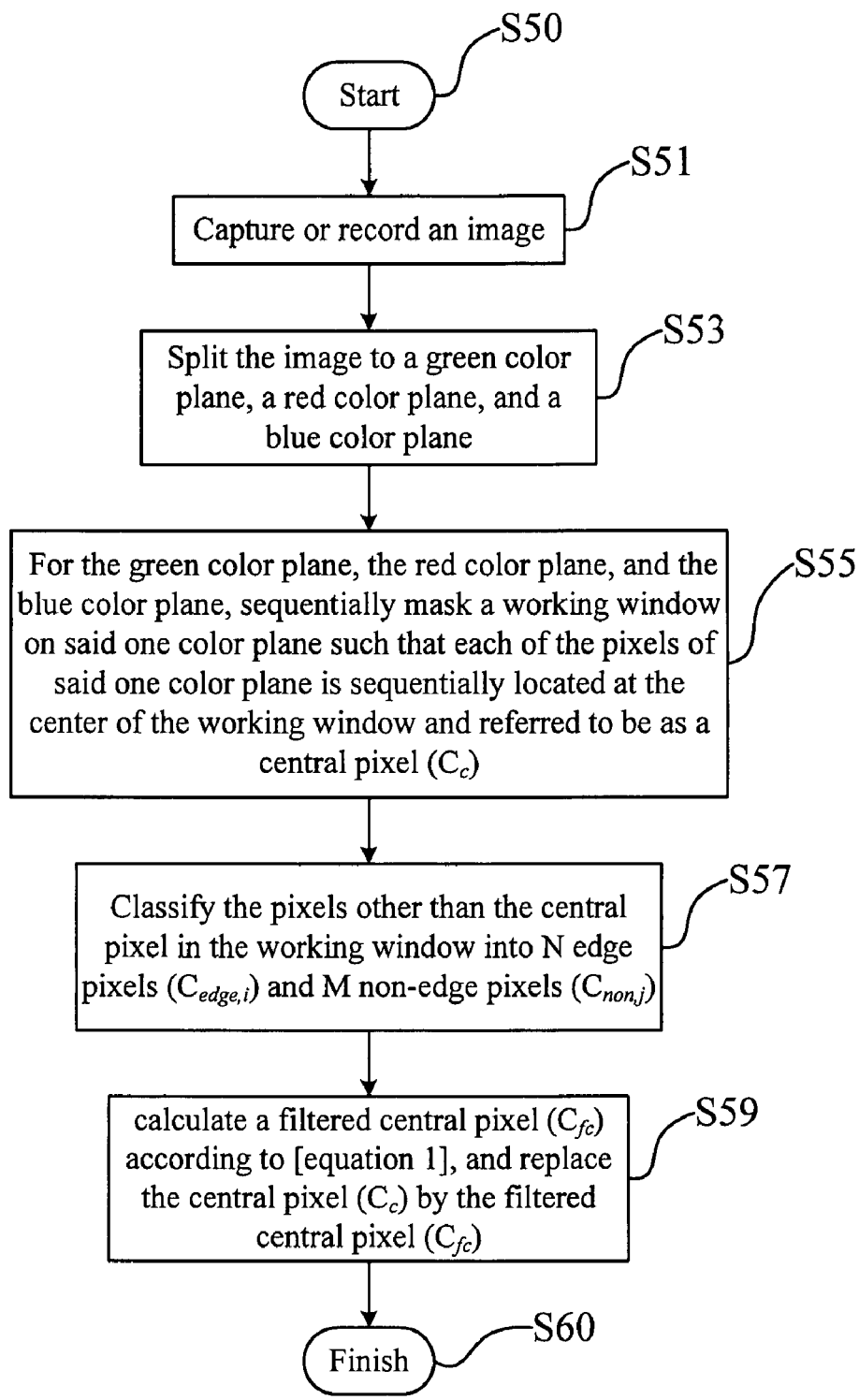
FIG. 1 shows a flow chart of the image processing method of an embodiment of the invention.

Please refer to FIG. 1, which shows a flow chart of the image processing method of an embodiment of the invention. The image processing method can be applied for reducing noises of a captured or recorded image in a color filter array (CFA) domain. Particularly, the CFA is arranged in a Bayer pattern.

As shown in FIG. 1, the method includes the following steps:

Step S51, capture or record an image.

Step S53, split the captured or recorded image to a green color plane, a red color plane, and a blue color plane.

Step S55, for the green color plane, the red color plane, and the blue color plane, sequentially mask a working window on each of the color planes such that each of the pixels of each color plane is sequentially located at the center of the working window and referred to as a central pixel ($C_c$).

Step S57, classify the pixels other than the central pixel in the working window into N edge pixels ($C_{edge,i}$) and M non-edge pixels ($C_{non,j}$). Both N and M are integers larger than 1, i is an integer index ranging from 1 to N, and j is an integer index ranging from 1 to M.

Step S59, calculate a filtered central pixel ($C_{fc}$) according to the following equation, and replace the central pixel ($C_c$) with the filtered central pixel ($C_{fc}$):

$$C_{fc} = \frac{C_c + \sum_{i=1}^{N} C_{edge,i} \cdot WEI2(|C_c - C_{edge,i}|) + \sum_{j=1}^{M} C_{non,j} \cdot WEI1(|C_c - C_{non,j}|)}{1 + \sum_{i=1}^{N} WEI2(|C_c - C_{edge,i}|) + \sum_{j=1}^{M} WEI1(|C_c - C_{non,j}|)} \quad \text{[Equation 1]}$$

wherein WEI1 is a first distribution function, and WEI2 is a second distribution function.

Figure 2A:
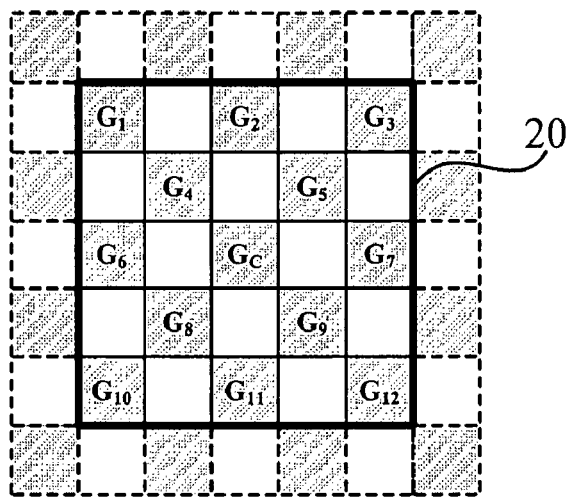
FIG. 2A illustrates the green color plane masked by the working window of an embodiment of the invention.
Figure 2B:
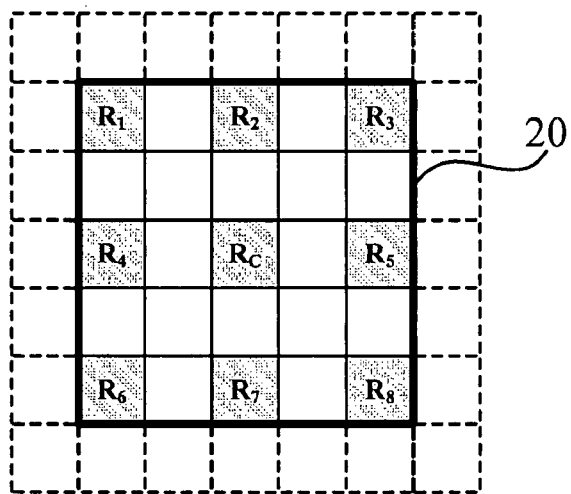
FIG. 2B illustrates the red color plane masked by the working window of an embodiment of the invention.
Figure 2C:
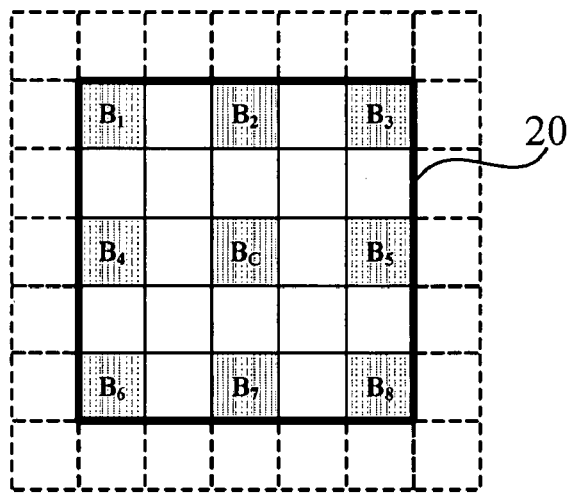
FIG. 2C illustrates the blue color plane masked by the working window of an embodiment of the invention.

Please refer to FIG. 2, which illustrates the color plane masked by the working window 20 of an embodiment of the invention. As shown in FIG. 2, the above-mentioned captured or recorded image is split into a green color plane (FIG. 2A), a red color plane (FIG. 2B), and a blue color plane (FIG. 2C), and each of the three color planes is masked by the working window 20.

Furthermore, the area masked by the working window 20 on the green color plane contains total thirteen pixels from $G_1$ to $G_{12}$ and the central pixel $G_c$. Moreover, among the thirteen pixels, pixels $G_2$, $G_6$, $G_7$, and $G_{11}$ are classified as edge pixels, whereas pixel $G_1$, $G_3$, $G_4$, $G_5$, $G_8$, $G_9$, $G_{10}$, and $G_{12}$ are classified as non-edge pixels. Therefore, according to the method of the invention, the central pixel $G_c$ is calculated by the above-mentioned [Equation 1] as a filtered central $G_{fc}$:

$$G_{fc} = \{G_c + [G_1 \cdot WEI1(|G_c - G_1|)] + [G_2 \cdot WEI2(|G_c - G_2|)] + \\ [G_3 \cdot WEI1(|G_c - G_3|)] + [G_4 \cdot WEI1(|G_c - G_4|)] + \\ [G_5 \cdot WEI1(|G_c - G_5|)] + [G_6 \cdot WEI2(|G_c - G_6|)] + \\ [G_7 \cdot WEI2(|G_c - G_7|)] + [G_8 \cdot WEI1(|G_c - G_8|)] + \\ [G_9 \cdot WEI1(|G_c - G_9|)] + [G_{10} \cdot WEI1(|G_c - G_{10}|)] + \\ [G_{11} \cdot WEI2(|G_c - G_{11}|)] + [G_{12} \cdot WEI1(|G_c - G_{12}|)]\} / \\ \{1 + WEI1(|G_c - G_1|) + WEI2(|G_c - G_2|) + WEI1(|G_c - G_3|) + WEI1(|G_c - G_4|) + WEI1(|G_c - G_5|) + WEI2(|G_c - G_6|) + WEI2(|G_c - G_7|) + WEI1(|G_c - G_8|) + WEI1(|G_c - G_9|) + WEI1(|G_c - G_{10}|) + WEI2(|G_c - G_{11}|) + WEI1(|G_c - G_{12}|)\}$$

Furthermore, other pixels on the green color plane are sequentially calculated to obtain the filtered pixel value thereof by the calculating method described above.

In addition, the area masked by the working window 20 on the red color plane of FIG. 2B contains total nine pixels from $R_1$ to $R_8$ and the central pixel $R_c$. Moreover, among the nine pixels, pixels $R_2$, $R_4$, $R_5$, and $R_7$ are classified as edge pixels, whereas pixels $R_1$, $R_3$, $R_6$, and $R_8$ are classified as non-edge pixels. Therefore, according to the method of the invention, the central pixel $R_c$ is calculated by the above-mentioned [Equation 1] as a filtered central $R_{fc}$:

$$R_{fc} = \{R_c + [R_1 \cdot WEI1(|R_c - R_1|)] + [R_2 \cdot WEI2(|R_c - R_2|)] + \\ [R_3 \cdot WEI1(|R_c - R_3|)] + [R_4 \cdot WEI2(|R_c - R_4|)] + \\ [R_5 \cdot WEI2(|R_c - R_5|)] + [R_6 \cdot WEI1(|R_c - R_6|)] + [R_7 \cdot WEI2(|R_c - R_7|)] + [R_8 \cdot WEI1(|R_c - R_8|)]\} / \{1 + WEI1(|R_c - R_1|) + WEI2(|R_c - R_2|) + WEI1(|R_c - R_3|) + WEI2(|R_c - R_4|) + WEI2(|R_c - R_5|) + WEI1(|R_c - R_6|) + WEI2(|R_c - R_7|) + WEI1(|R_c - R_8|)\}$$

Similarly, other pixels on the red color plane are sequentially calculated to obtain the filtered pixel value thereof by the calculating method described above.

Furthermore, the area masked by the working window 20 on the blue color plane of FIG. 2C contains total nine pixels from $B_1$ to $B_8$ and the central pixel $B_c$. Among the nine pixels, pixels $R_2$, $R_4$, $R_5$, and $R_7$ are classified as edge pixels, whereas pixels $R_1$, $R_3$, $R_6$, and $R_8$ are classified as non-edge pixels. Therefore, according to the method of the invention, the central pixel $B_c$ is calculated by the above-mentioned [Equation 1] as a filtered central $B_{fc}$:

$$B_{fc} = \{B_c + [B_1 \cdot WEI1(|B_c-B_1|)] + [B_2 \cdot WEI2(|B_c-B_2|)] + [B_3 \cdot WEI1(|B_c-B_3|)] + [B_4 \cdot WEI2(|B_c-B_4|)] + [B_5 \cdot WEI2(|B_c-B_5|)] + [B_6 \cdot WEI1(|B_c-B_6|)] + [B_7 \cdot WEI2(|B_c-B_7|)] + [B_8 \cdot WEI1(|B_c-B_8|)]\}/\{1 + WEI1(|B_c-B_1|) + WEI2(|B_c-B_2|) + WEI1(|B_c-B_3|) + WEI2(|B_c-B_4|) + WEI2(|B_c-B_5|) + WEI1(|B_c-B_6|) + WEI2(|B_c-B_7|) + WEI1(|B_c-B_8|)\}$$

Similarly, other pixels on the blue color plane are sequentially calculated to obtain the filtered pixel value thereof by the calculating method described above.

Figure 3A:
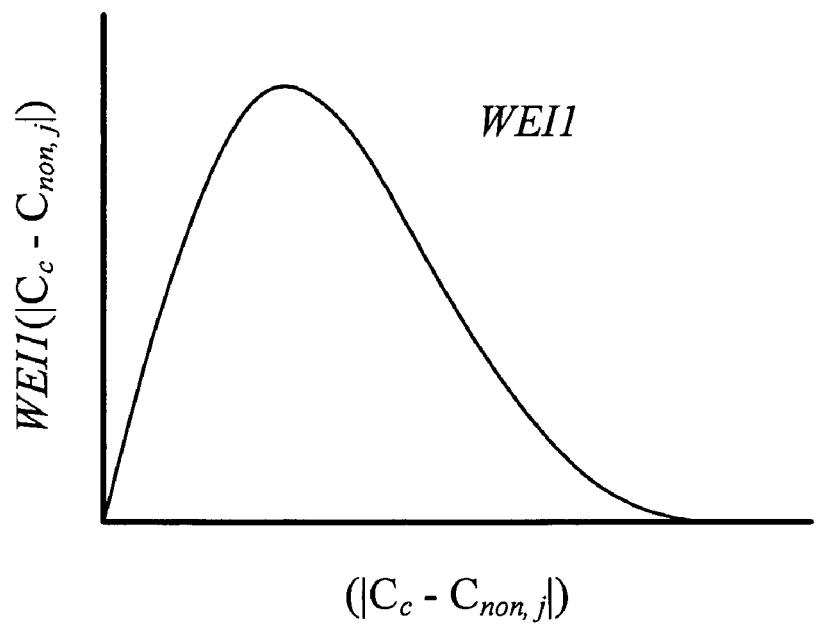
FIG. 3A shows the first Rayleigh distribution function of the invention.
Figure 3B:
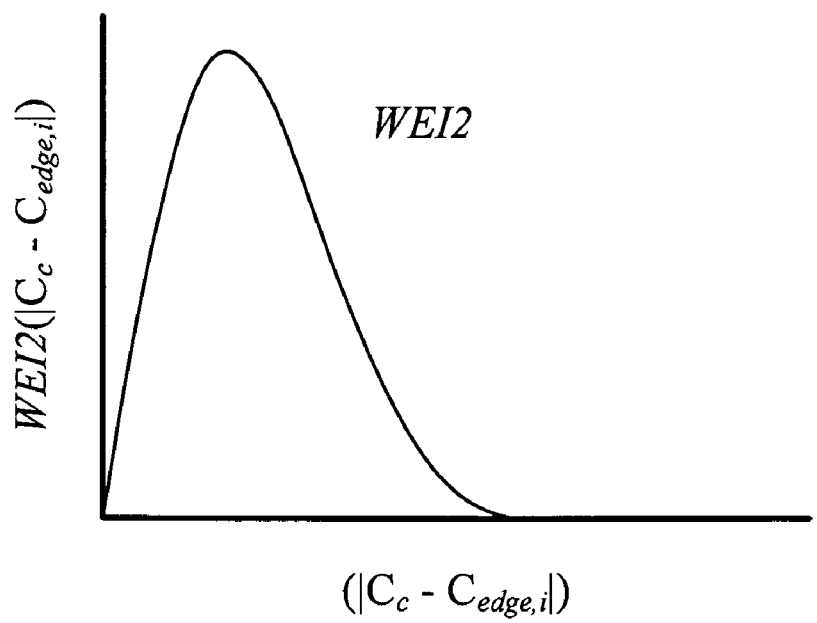
FIG. 3B shows the second Rayleigh distribution function of the invention.

In an embodiment, both the first distribution function and the second distribution function are Rayleigh distribution functions. Please refer to FIG. 3, which shows the Rayleigh distribution functions of the invention. In FIG. 3, the cross axle represents the modulus of the deviation of the central pixel and other pixels; and the vertical axle represents the value of the Rayleigh distribution function with the modulus. In the embodiment, when the other pixels belong to non-edge pixels, the Rayleigh distribution function (the first distribution function) as shown in FIG. 3A is applied, and when the other pixels belong to edge pixels, the Rayleigh distribution function (the second distribution function) as shown in FIG. 3B is applied.

Figure 4A:
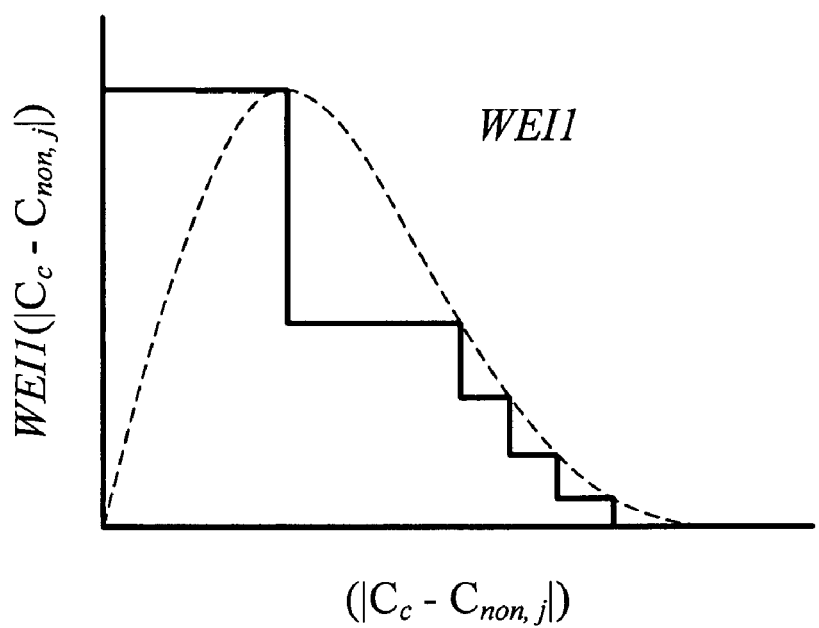
FIG. 4A shows the first step function simplified from the first Rayleigh distribution function of FIG. 3A.
Figure 4B:
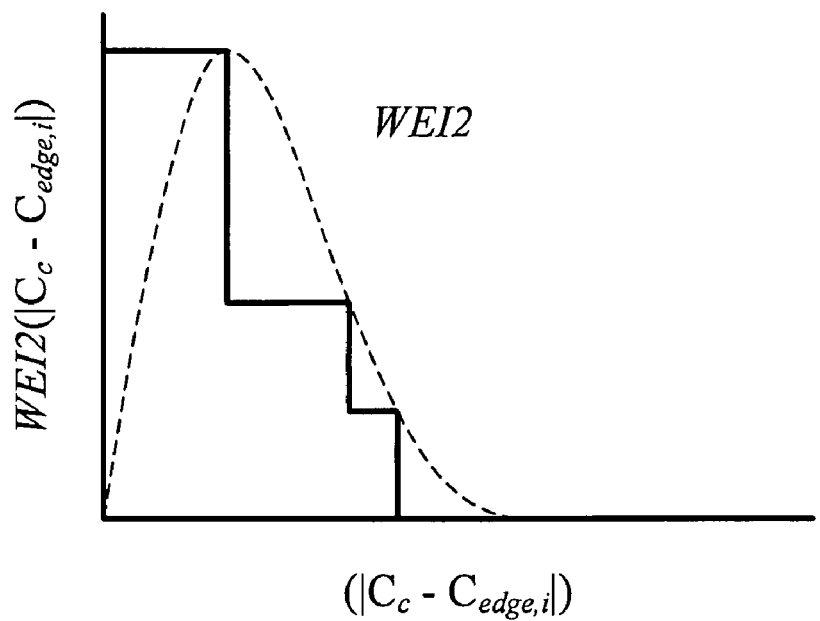
FIG. 4B shows the second step function simplified from the second Rayleigh distribution function of FIG. 3B.

Furthermore, in practice, the first distribution function and the second distribution function can be implemented as a first step function and a second step function respectively by simplifying the Rayleigh distribution function. Please refer to FIG. 4A and FIG. 4B. FIG. 4A shows the first step function simplified from the first Rayleigh distribution function of FIG. 3A; and FIG. 4B shows the second step function simplified from the second Rayleigh distribution function of FIG. 3B. In practice, the first step function is suitable for calculating on the non-edge pixels; and the second step function is suitable for calculating the edge pixels.

Please note that the image processing method can optionally contain plural sets of the first distribution function and the second distribution function, for instance, sets of the first distribution function and the second distribution function for different ISO values, so as to increase the noise suppression efficiency.

By the above-mentioned methods, the present invention re-calculates the pixel value of each pixel of each color plane, based on the distinguish of the edge pixels and the non-edge pixels, and on the first distribution function and the second distribution, and replaces the original pixel value by the re-calculated pixel value, so as to suppress the noises of a captured or recorded image remained in the CFA domain.

Figure 5:
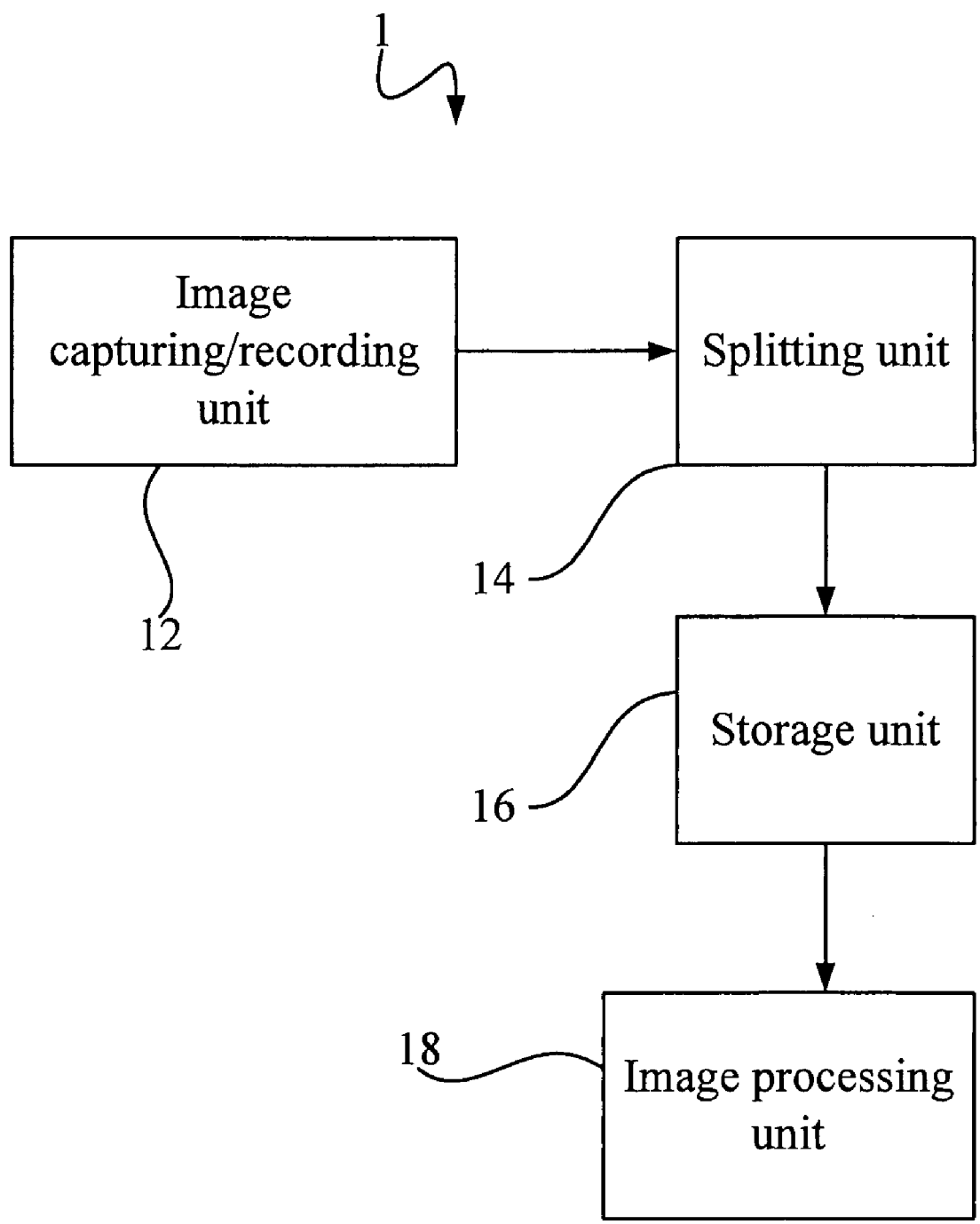
FIG. 5 is a functional block of the image processing apparatus of an embodiment of the invention.

Please refer further to FIG. 5, which shows a functional block of the image processing apparatus 1 of an embodiment of the invention. The image processing apparatus 1 is used for suppressing the noises of a captured or recorded image remained in the CFA domain. Particularly, the CFA is arranged in a Bayer pattern As shown in FIG. 5, the image processing apparatus 1 includes an image capturing/recording unit 12, a splitting unit 14, a storage unit 16, and an image processing unit 18.

The image capturing/recording unit 12, such as CCD or CMOS sensing device, is used for capturing/recording the image. The splitting unit 14 is coupled to the image capturing/recording unit 12, for splitting the image into a green color plane, a red color plane, and a blue color plane. In addition, the storage unit 16 is coupled to the splitting unit 14, for separately receiving a green color plane, a red color plane and a blue color plane of the image.

Furthermore, the image processing unit 18 is coupled to the storage unit 16, for sequentially masking a working window on the green color plane, the red color plane, and the blue color plane, such that each pixel on each of the said color planes is sequentially located at the center of the working window and referred to as a central pixel ($C_c$). The image processing unit 18 also classifies the pixels other than the central pixel in the working window into N edge pixels ($C_{edge,i}$) and M non-edge pixels ($C_{non,j}$). Both N and M both are integers larger than 1, i is an integer index ranging from 1 to N, and j is an integer index ranging from 1 to M.

Furthermore, the image processing unit 18 also calculates a filtered central pixel ($C_{fc}$) according to the above-mentioned [equation 1], and replaces the central pixel ($C_c$) with the filtered central pixel ($C_{fc}$). The image processing apparatus 1 can suppress the noises of the image remained in the CFA domain by the above-mentioned units.

Please note that the equation used for the image process apparatus 1 to calculate the filtered central pixel ($C_{fc}$) is the same as the above-mentioned [equation 1], and both the first distribution function and the second distribution function can also be Rayleigh distribution functions or step functions, thus, discussion of unnecessary details will be omitted.

In summary, the image processing apparatus and method of the invention can calculate the pixels (edge pixels and non-edge pixels) with different characteristics remained in the CFA domain by corresponding distribution functions, to reach the noise suppression effect. Furthermore, the image processing apparatus and method of the invention can increase the whole image processing efficiency and reduce the hardware cost. Particularly, the image processing apparatus and method of the invention can effectively suppress the noises in an image to increase the quality of the image, and can apply different distribution function according to different processing conditions to calculate the pixel value to reach the optimal effect.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An image processing method for reducing noises of a captured or recorded image in a color filter array (CFA) domain, said method comprising the steps of:

splitting the image into a green color plane, a red color plane and a blue color plane;

for each of the green color plane, the red color plane and the blue color plane, sequentially masking a working window on each of the color planes such that each pixel on each of the color planes is sequentially located at the center of the working window and referred to as a central pixel ($C_c$), and performing the steps of:

classifying the pixels other than the central pixel in the working window into N edge pixels ($C_{edge,i}$) and M non-edge pixels ($C_{non,j}$), both N and M being integers larger than 1, i being an integer index ranging from 1 to N, j being an integer index ranging from 1 to M; and calculating a filtered central pixel ($C_{fc}$) according to the following formula, and replacing the central pixel ($C_c$) with the filtered central pixel ($C_{fc}$):

$$C_{fc} = \frac{C_c + \sum_{i=1}^{N} C_{edge,i} \cdot WEI2(|C_c - C_{edge,i}|) + \sum_{j=1}^{M} C_{non,j} \cdot WEI1(|C_c - C_{non,j}|)}{1 + \sum_{i=1}^{N} WEI2(|C_c - C_{edge,i}|) + \sum_{j=1}^{M} WEI1(|C_c - C_{non,j}|)};$$

wherein WEI1 is a first distribution function, and WEI2 is a second distribution function;

whereby the noises of the image remained in the CFA domain are suppressed.

2. The image processing method of claim 1, wherein the first distribution function is the Rayleigh distribution function, and the second distribution is another Rayleigh distribution function.

3. The image processing method of claim 2, wherein the first distribution function is implemented into a first step function, and the second distribution function is implemented into a second step function.

4. The image processing method of claim 1, wherein the CFA is arranged in a Bayer pattern.

5. An image processing apparatus for reducing noises of a captured or recorded image in a color filter array (CFA) domain, said image processing apparatus comprising:

a storage unit, for separately receiving a green color plane, a red color plane and a blue color plane of the image; and an image processing unit, coupled to the storage unit, for each of the green color plane, the red color plane and the blue color plane, for sequentially masking a working window on each of the color planes such that each of the pixels on each of the color planes is sequentially located at the center of the working window and referred to as a central pixel ($C_c$), classifying the pixels other than the central pixel in the working window into N edge pixels ($C_{edge,i}$) and M non-edge pixels ($C_{non,j}$), both N and M being integers larger than 1, i being an integer index ranging from 1 to N, j being an integer index ranging from 1 to M, and calculating a filtered central pixel ($C_{fc}$) according to the following formula, and replacing the central pixel ($C_c$) with the filtered central pixel ($C_{fc}$):

$$C_{fc} = \frac{C_c + \sum_{i=1}^{N} C_{edge,i} \cdot WEI2(|C_c - C_{edge,i}|) + \sum_{j=1}^{M} C_{non,j} \cdot WEI1(|C_c - C_{non,j}|)}{1 + \sum_{i=1}^{N} WEI2(|C_c - C_{edge,i}|) + \sum_{j=1}^{M} WEI1(|C_c - C_{non,j}|)};$$

wherein WEI1 is a first distribution function, and WEI2 is a second distribution function;

whereby the noises of the image remained in the CFA domain are suppressed.

6. The image processing apparatus of claim 5, wherein the first distribution function the Rayleigh distribution function, and the second distribution is another Rayleigh distribution function.

7. The image processing apparatus of claim 6, wherein the first distribution function is implemented into a first step function, and the second distribution function is implemented into a second step function.

8. The image processing apparatus of claim 5, wherein the CFA is arranged in a Bayer pattern.

\* \* \* \* \*